United States Patent [19]

Haeg

[11] Patent Number: 4,658,656
[45] Date of Patent: Apr. 21, 1987

[54] MULTIPLE AXIS TEST MACHINE REPRODUCING ROAD EXCITED VEHICLE VIBRATION

[75] Inventor: Steven R. Haeg, Shorewood, Minn.

[73] Assignee: MTS Systems Corporation, Eden Prairie, Minn.

[21] Appl. No.: 770,317

[22] Filed: Aug. 28, 1985

[51] Int. Cl.[4] .............................................. G01H 1/00
[52] U.S. Cl. ......................................... 73/669; 73/798
[58] Field of Search .............. 73/669, 798, 146, 432 V

[56] References Cited

U.S. PATENT DOCUMENTS

| | | | |
|---|---|---|---|
| 3,713,330 | 1/1973 | Lentz | 73/798 |
| 3,718,033 | 2/1973 | Peterson | 73/669 |
| 4,263,809 | 4/1981 | Peterson et al. | 73/798 |
| 4,479,382 | 10/1984 | Greenhorn et al. | 73/146 |

OTHER PUBLICATIONS

Cripe, Ronald A., "Making a Road Simulator Simulate," Chevrolet Motor Division, General Motors Corporation, SAE No. 720095, Jan. 1972, pp. 1–12.

Primary Examiner—Stephen A. Kreitman
Attorney, Agent, or Firm—Kinney & Lange

[57] ABSTRACT

A testing machine reproduces road excited vibrations for the purposes of testing vehicle wheel support specimens, for example McPherson strut assemblies used in front wheel drive vehicles, the system permits force inputs of horizontal, steering, vertical, and wheel hop loads, as well as, optionally, simulating braking loads. The loading fixture is compact, and substantially eliminates cross coupling of horizontal loading due to steering motion of the device, even though the steering motions provide for large steering excursions. The loading is tire coupled to simulate actual conditions, including wheel hop that occurs during road travel, and further provides for inherent cross coupling compensation to permit easy instrumentation and very close simulation of road induced vehicle vibrations during the testing process. The entire steering linkage can be tested, including tie rods, tie rod ends, and the wheel suspension mechanism.

18 Claims, 9 Drawing Figures

MULTIPLE AXIS TEST MACHINE REPRODUCING ROAD EXCITED VEHICLE VIBRATION

BACKGROUND OF THE INVENTION

1. Field of the Invention

The present invention relates to a testing system which simulates road induced vehicle vibration and loads for testing vehicle front wheel drive components.

2. Description of the Prior Art

In the prior art the use of road simulators has been recognized as being desirable, and various road simulators that will test axles and spindles have been advanced. The problems associated with road simulators has been outlined in an article entitled "Making A Road Simulator Simulate", by Ronald A. Cripe (SAE No. 720095, 1972). In particular, the importance of loading the test specimen using a simulated rolling tire configuration, and the problems associated therewith are discussed.

The "wheel hop" phenomena is also discussed in that article. Wheel hop can be explained briefly as the loading which occurs when the tire leaves the road. The vertical load on the pavement is thus reduced, and therefore the horizontal load drops off substantially. Simulating this loading under the various spring rates that are encountered on the road, particularly during steering motions, has proved to be a substantial problem.

Further, the problems associated with cross coupling of forces in vertical and horizontal inputs when testing front wheel axles has long been recognized. Devices for compensating the cross coupling effects mechanically and electrically have been advanced. For example, U.S. Pat. No. 3,713,330, issued in Jan. 1973 to Thomas Lentz for an Axle Test Device, greatly simplifies the mechanical arrangement required for force cross coupling compensation, and uses bell crank loading.

U.S. Pat. No. 3,718,033, issued Feb. 27, 1973 to Petersen, for a Testing Apparatus Utilizing Position-Force Cross Coupling Control teaches dynamic cross coupling compensation in vertical and horizontal loading actuators by adding a compensating signal to the servovalve control for the horizontal loading actuator, which signal is dependent upon the position of the vertical actuator. These devices both work well for testing spindles, but some of the loading problems, such as simulated wheel hop, are not solved by such devices.

A test system that includes fixtures to apply loads in additional axes is shown in U.S. Pat. No. 4,263,809, issued in Apr. 1981 to Petersen et al., and this too uses cross coupling compensating load linkages and bell crank loading devices.

In addition to wheel hop, problems in testing wheel support components arise because of a torque steer effect that is described and discussed in U.S. Pat. No. 4,479,382, issued to Greenhorn et al., on Oct. 30, 1984 and entitled System For Testing A Tire To Avoid A Torque Steer Effect.

The effect of torque steer effect is minimized in the present device by having a single base that provides for steering and all horizontal loading is tied back to this base in the present device.

SUMMARY OF THE INVENTION

The present invention relates to a multi-axis road simulator that is compact, and made to accept a front wheel drive hub support for testing which allows for free suspension response to vertical inputs, that is, vertical loads will load the suspension members as they would in a vehicle. The mass attached to the drive hub to facilitate load inputs can be made to equal the mass removed from the actual vehicle unsprung mass so that the loading will be the same as that encountered in actual use. Cross coupling compensation may be supplied by sensing the actual free responding suspension stroke to provide signals for compensating the horizontal load actuators similar to the prior U.S. Pat. No. 3,718,033 to Petersen, and the load applying components can be adjusted to allow for various suspension geometries so that the movement of the suspension system under vertical loading can be closely duplicated. The sensing of the actual vertical position of the wheel spindle is carried out for control.

The test front drive tire hub and axle is loaded through a pneumatic coupling tire loading the axles as in use, and the steering motions are provided by moving the pneumatic coupling (tire) that applies the vertical load, about the steering axis. The steering base or turntable is fairly large and has inertia that will mechanically filter out high frequency steer torque loads from the steering motions. The structure also separates out the steering loads from the steering motions to permit more rapid load response with large steer excursions.

Brake torque loading can be simulated if desired, and if brake loading is not desired, a very rigid system is used. A longitudinal load can be applied at the tire patch location without causing torsional loading (brake torque loading) of the specimen because the torque is reacted through a torque tube mounted on the steering turntable which follows the other load inputs.

A hydraulic motor is utilized to input steering wheel motions, and the entire steering linkage can be tested, including the tie rods, tie rod ends and the like. The steering motor provides a command input which drives another motor that rotates the turntable to provide steering motion at the tire interface.

Because of the ability to control the specimen position and loading accurately, wheel hop can be simulated because the position of the tire patch can be sensed accurately and the road position can be sensed, and when the loading wheel is simulated as leaving the road, the horizontal load is reduced or driven to a desired value simultaneously.

DETAILED DESCRIPTION OF THE PREFERRED EMBODIMENT

Figure 1:
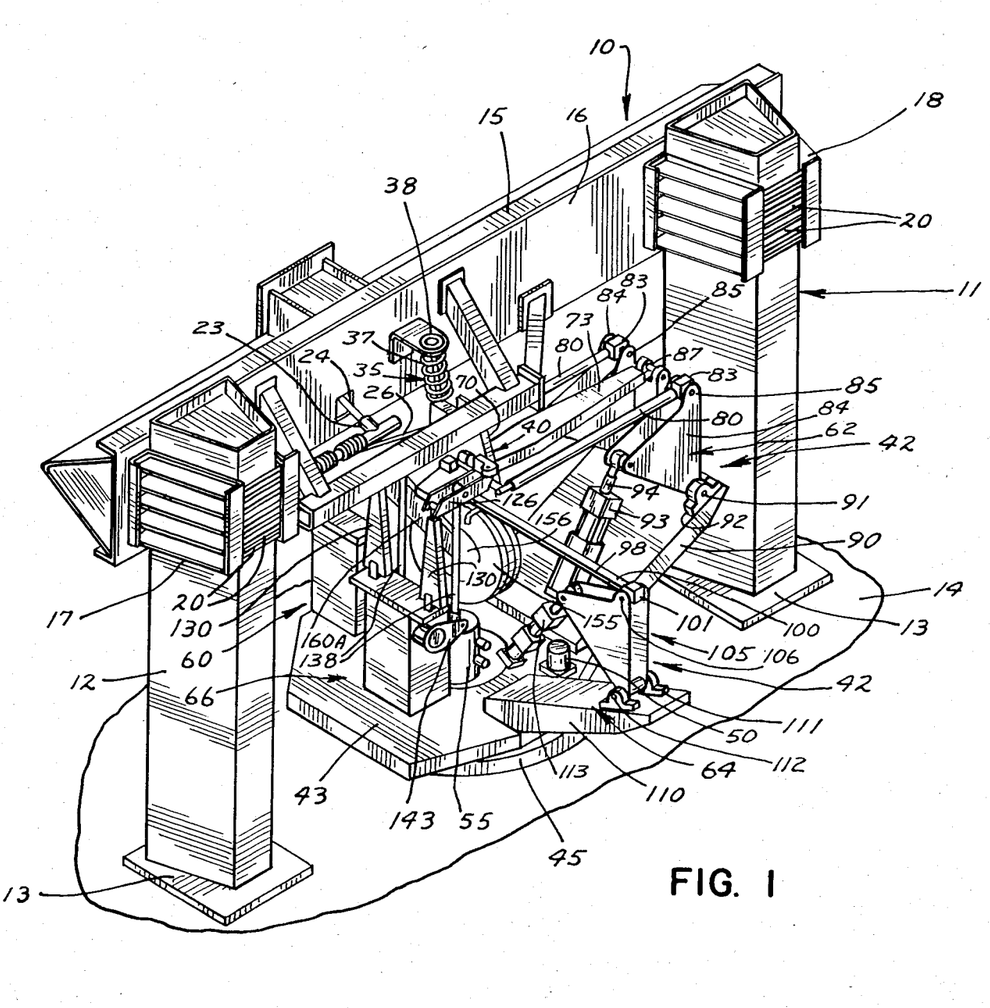
FIG. 1 is a part schematic perspective representation of a test system made according to the present invention.

In FIG. 1, the test system indicated generally at 10 includes an outer frame assembly 11. Frame assembly 11 is mounted relative to a very large mass base or foundation, and comprises a pair of upright columns of suitable design indicated generally at 12. The columns 12 have base plates 13 that are attached to the foundation indicated generally at 14, and the columns support a cross frame 15 that has a main cross member 16, and clamps 17 and 18 at opposite ends thereof. The clamps 17 and 18 are clamped onto the trapezoidal cross section columns 12 through the use of draw bolts 20, that are shown in FIG. 1. The clamps 17 and 18 may be adjustably mounted for horizontal adjustment on the cross member 16, and vertical adjustment can be obtained by loosening the draw bolts 20 and permitting the cross member 16 to be adjusted up and down on the columns 12 as desired. The cross member 16 is used to mount a steering motor 25, which is shown in FIG. 2 at 22. The motor 25 in turn is connected to a steering gear indicated generally at 23 in both FIGS. 1 and 2. The tie rods and connected mechanism will steer or move in the test device disclosed, and the motor 25 provides a feedback signal to drive another motor to rotate a platform support or turntable as will be explained. The steer input can be from input control or command signal generators conventional in servo controls.

The steering gear 23 is suitably anchored to the frame so that the drive shaft 24 from the motor 25 will drive the tie rods 26. The loads on the tie rods 26 are indicated by the double arrow 27 in lateral directions. Two tie rods 26 can be held simultaneously if desired, but the one tie rod 26 shown to the right in FIG. 2 is connected as at 28 through a suitable tie rod end to a steering arm 32 that in turn is attached to an axle or spindle housing 33, that as shown is attached to a McPherson strut assembly indicated generally at 35. The strut assembly includes a strut cartridge 36 and an outer spring 37. A top plate 38 of the strut assembly is suitably anchored to cross member 16 in a desired manner, so that movement vertically of the axle housing 33 will cause the spring 37 to compress, exerting loads on a drive axle housed in housing 33 and the McPherson strut. This loading can be continued while steering loads are introduced, as will be explained.

A specimen adapter indicated generally at 40 is connected to the drive spindle and loads the specimen while moving in the same manner as a support wheel on a vehicle in other directions of motion. The turning or steering signal or a feedback signal from a transducer is used as a control signal for rotating a turntable 43 relative to the support frame 10 and specimen adapter 40. Rotating the turntable 43 will provide steering motion, which is separated from the steering loads. The steering loads can be sensed independently of motion.

Figure 4:
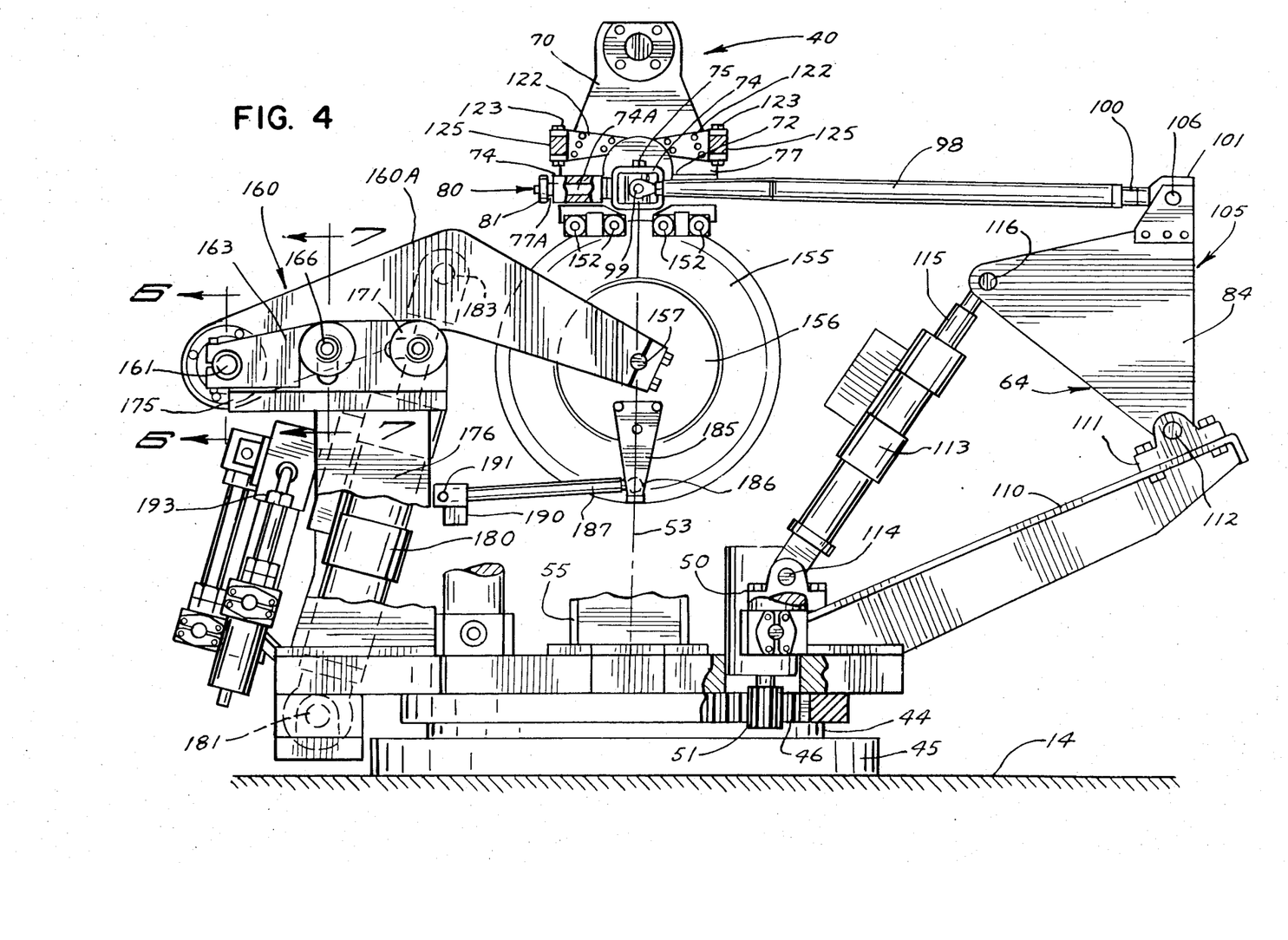
FIG. 4 is an end view taken on line 4—4 in FIG. 3.

The entire fixturing assembly for applying vertical, longitudinal, lateral and steer loads is indicated generally at 42, and is mounted onto the platform or turntable 43 that is rotatably mounted relative to the foundation 14, and as shown in FIG. 4 for example, this rotatable platform or turntable 43 is mounted onto a suitable bearing assembly 44 with respect to a base plate 45 that is fixed to the foundation 14. An internal toothed ring gear 46 is fastened to the base plate 45, and is thus fixed with respect to the foundation 14. The turntable 43 can rotate relative to the internal toothed ring gear and is supported on bearing assembly 44 to do so.

The steering follow up motion is achieved by using a steering motion hydraulic motor 50, which is fixed to turntable 43, and which has an output gear 51 that is drivably mounted on the output shaft of the hydraulic motor 50. Output gear 51 meshes with the internal teeth of the ring gear 46, and will, when the motor 50 is powered, rotate the turntable 43 by driving it around the central axis 53 of the turntable 43. This axis lies on a plane that represents the central plane of a wheel mounted on the front axle or spindle being tested.

The turntable 43 is self contained, and all of the load input members rotate on the turntable 43 relative to the frame assembly 10 and specimen adapter 40. This eliminates cross coupling of loads during steering motions, thereby simplifying the controls necessary. Referring to FIGS. 1 and 2, again, in particular, it can be seen that the turntable 43 has a central opening 54 and a hydraulic commutator 55 of conventional design is mounted in the opening. The commutator 55 has a first portion mounted on the base and has pressure and return lines 57 leading from a suitable hydraulic pressure source. Pressure and return lines, indicated generally at 56 extend from the rotating outer portion of the commutator to the various actuators and motors that are mounted on the turntable 43. Hydraulic fluid under pressure can thus be provided to the rotating components from the stationary pressure source.

Figure 2A:
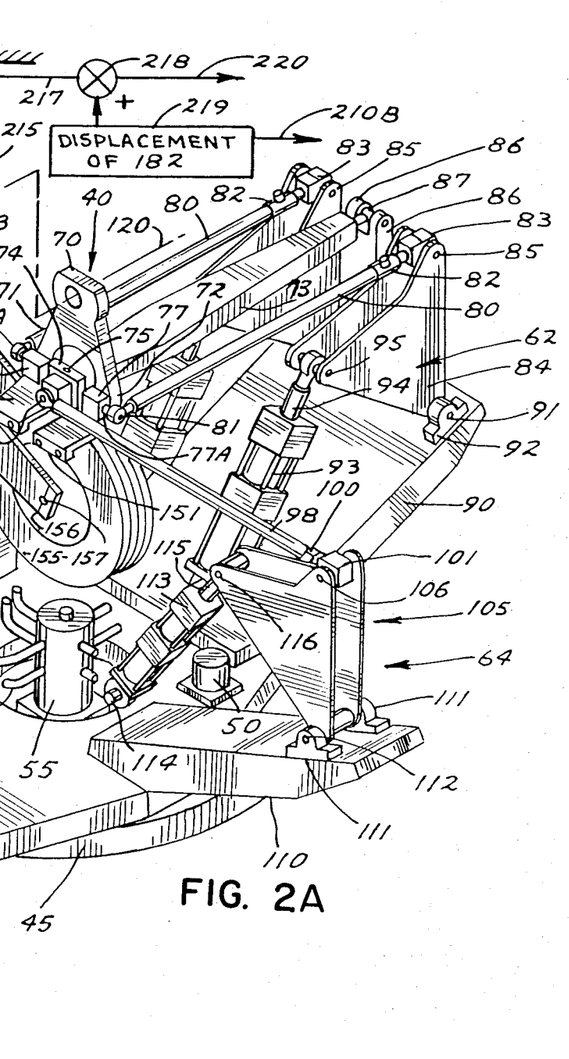
FIGS. 2a and 2b are a part schematic perspective view taken at the same orientation as FIG. 1, with parts removed for sake of clarity, and parts in exploded view also for showing other functions.
Figure 2B:
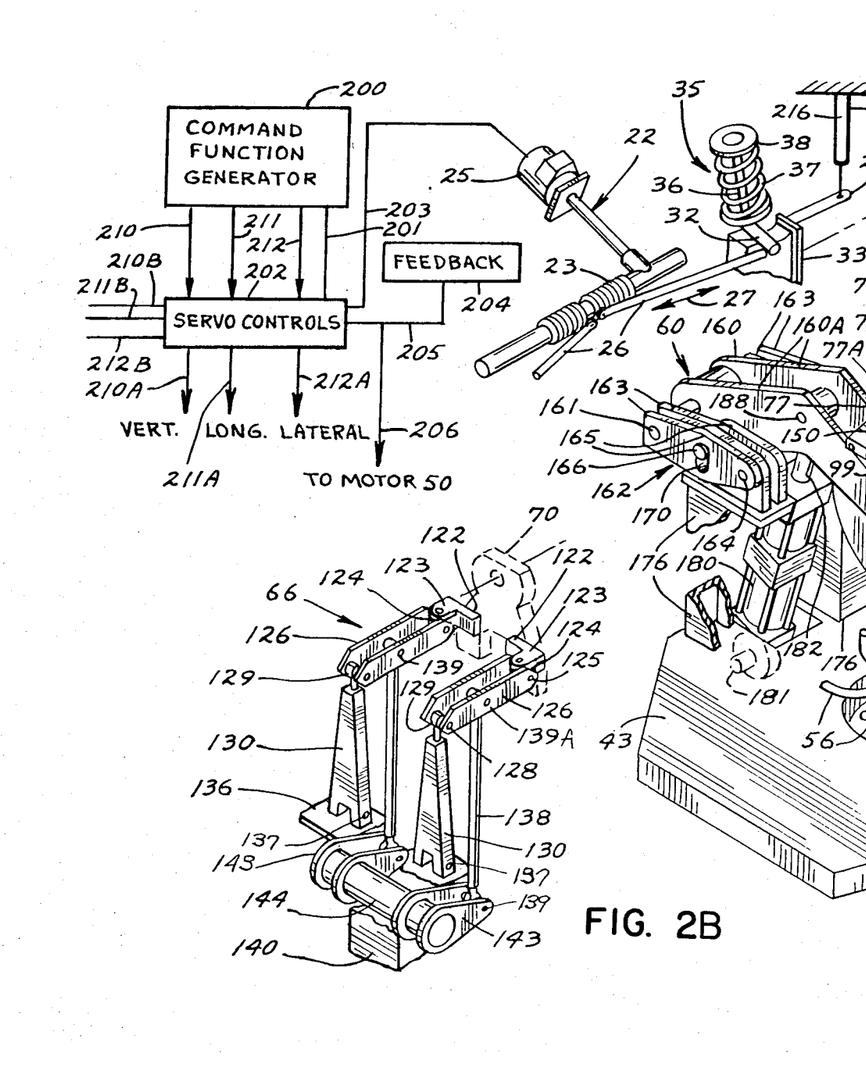
Figure 3:
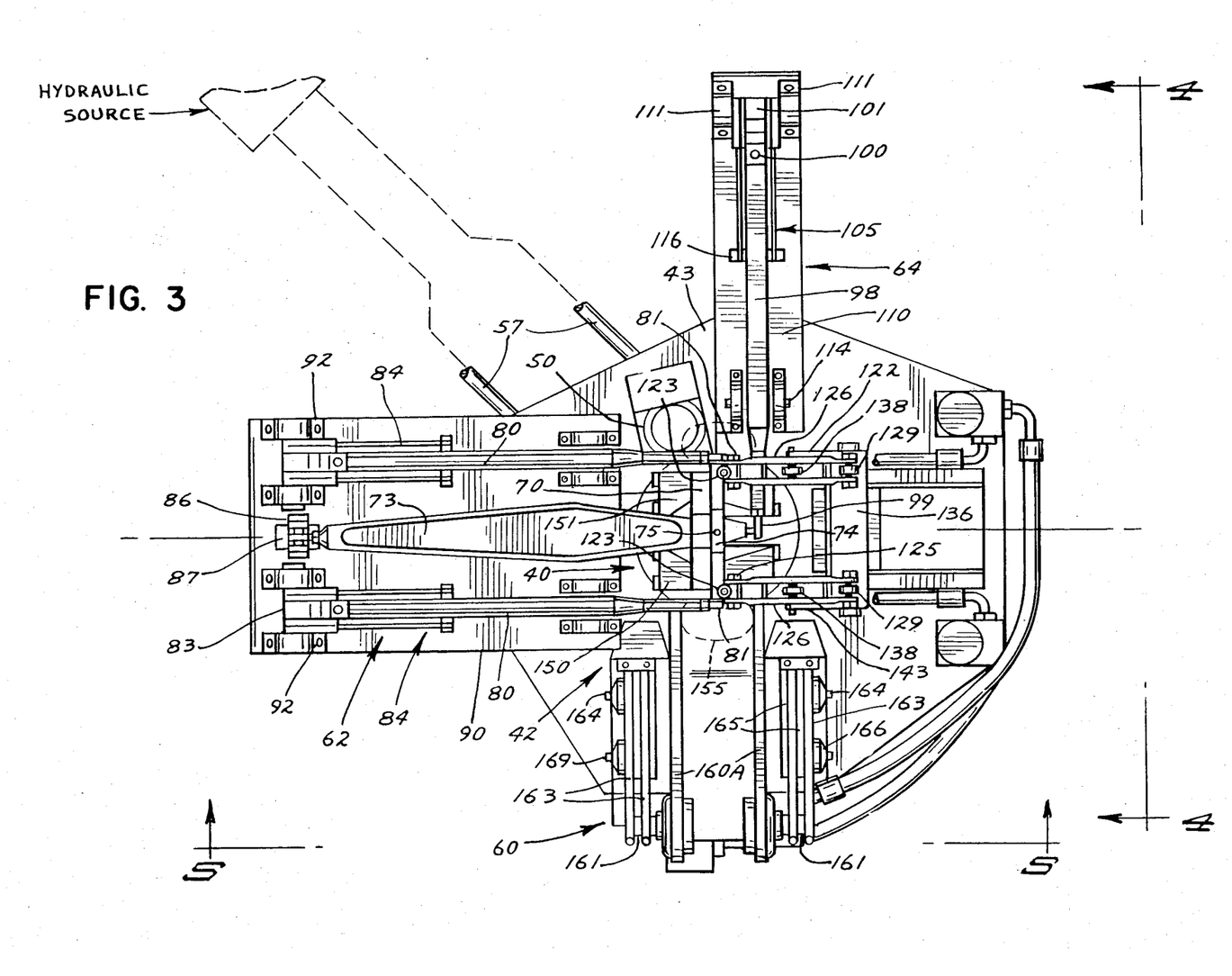
FIG. 3 is a top plan view of the test system of the present invention.

As perhaps can be best seen in FIG. 2a, the turntable 43 is used for mounting three major loading assemblies. There is a vertical input loading assembly 60, a lateral loading assembly indicated generally at 62, and a longitudinal loading assembly indicated generally at 64. In addition, there is a torque reaction assembly indicated at 66. In FIG. 2 the torque reaction assembly is separated from the main part of the assembly for sake of clarity, but can be seen in its working position in FIG. 1.

The specimen adapter 40 includes a specimen adapter plate or bracket 70 which is bifurcated and has a pair of legs 71 and 72. The legs 71 and 72 are spaced apart to span and support a longitudinal input loading lever 73 that fits through a bracket 74 that defines a central opening and which extends laterally, as shown. The lever 73 is pinned with a suitable pin 75 to straps defining the central opening in bracket 74. The bracket 74 has pins 74A on its ends (see FIG. 4 showing one pin) that define a mounting axis perpendicular to the axis of the pin 75, and the pins 74A in turn are pivotally mounted in lateral input loading blocks 77, mounted on opposite sides of the specimen adapter plate 70, at the lower ends of the legs 71 and 72, respectively. Each of the loading blocks 77 has loading pins 77A connected thereto that extend laterally outwardly, and a pair of lateral input loading struts 80 are attached to loading pins 77A on the respective opposite sides of the longitudinal loading lever 73, and extend generally parallel to the loading lever 73. The struts 80 are low mass, that is lightweight, and are attached to the blocks 77 through suitable rod ends 81. The opposite ends of struts 80 from the blocks 77 are attached to load cells 82 and then connected to bearing blocks 83, that in turn are connected to respective loading bell cranks 84. The bell cranks 84 have pins 85 for mounting the bearing blocks 83. The bell cranks 84 are on opposite sides of the lever 73.

An upright strut 86 is used for mounting the remote end of the lever 73. As can be seen, the lever 73 has a rod end 87 that is attached to a suitable pin on the upper end of the upright strut 86. The bell cranks 84 and the lower end of strut 86 are all attached to a support platform 90 that is fixed to the turntable 43, and which is inclined outwardly and upwardly at an incline relative to the turntable, and extends out beyond the turntable periphery. The bell cranks 84 are each attached on a separate pivot pin 91, through sets of bearings 92 to the platform 90. The lower end of upright strut 86 is fixed to the platform 90 in a suitable manner.

The bell cranks 84 are mounted for pivotal movement about the respective pins 91 and bearings 92, and are controlled by separate lateral input and steer torque hydraulic actuators indicated at 93. The actuators 93 are double acting, servo valve controlled hydraulic actuators of usual design having extendable and retractable rods 94 that are connected through suitable rod ends to pins 95 on the bell crank. The rods 94 are operated through internal pistons in the actuators. As can be seen, the bell cranks 84 move about the respective main pivot pin 91, when loads are applied to the loading pin 95 which couple the actuators 93 to the bell cranks. The pivot pins 85 carry the loads on the struts 80. It can be seen that the actuators 93 have their lower ends connected to the turntable 43 with suitable pins and the actuator can be individually controlled if desired to exert different loads on the respective struts 80. Each of the blocks 77 is attached to a separate leg 71 and 72, respectively, of the specimen adapter member 70, so a torque can be exerted about the axis of the pin 75 which couples the loading struts 80 to the specimen adapter plate 70.

Differential loading between the two struts 80, so that the legs 71 and 72 of the specimen adapter 70 are unequally loaded, will input a steering torque load to the specimen.

The lateral input loading assembly 64 includes the lever 73, which is anchored to the upright member or mast 86. The lever 73 is pivotally connected to the bracket 74 with the pin 75 as explained. The end of the lever 73 that extends through the bracket 74 (the bracket 74 is pivotally mounted about the axis of the pins 77A) has a pin thereon on which a longitudinal loading input strut 98 is mounted. The longitudinal load input strut 98 has a rod end 99 that is connected to the pin on the end of the lever 73, and a load cell 100 is connected to the opposite end of strut 98. The load cell 100 and strut 98 are connected through a mounting block 101 to a bell crank assembly 105. The block 101 is mounted with a pin 106 to the bell crank assembly 105 about an axis parallel to the pin at rod end 99.

The bell crank assembly 105 is supported on a longitudinal input reaction platform 110 that is fixed to the turntable 43. Bearings 111 are mounted on platform 110 and in turn the bearings 111 mount a pin 112 that pivotally mounts the lower end of the bell crank assembly 105. A longitudinal input, servo controlled, double acting hydraulic actuator shown at 113 has its base end connected as at 114 to the turntable 43. The actuator 113 has an extendable and retractable rod 115 that is connected with a pin 116 to the bell crank assembly 105 at locations spaced from both of the pins 106 and 112.

The operation of the actuator 113 will load tension or compression loads in the strut 98, and such loads will be measured by the load cell 110 for control purposes. The loads in strut 98 will be applied through lever 73 to specimen adapter plate and thus to the specimen.

Figure 5:
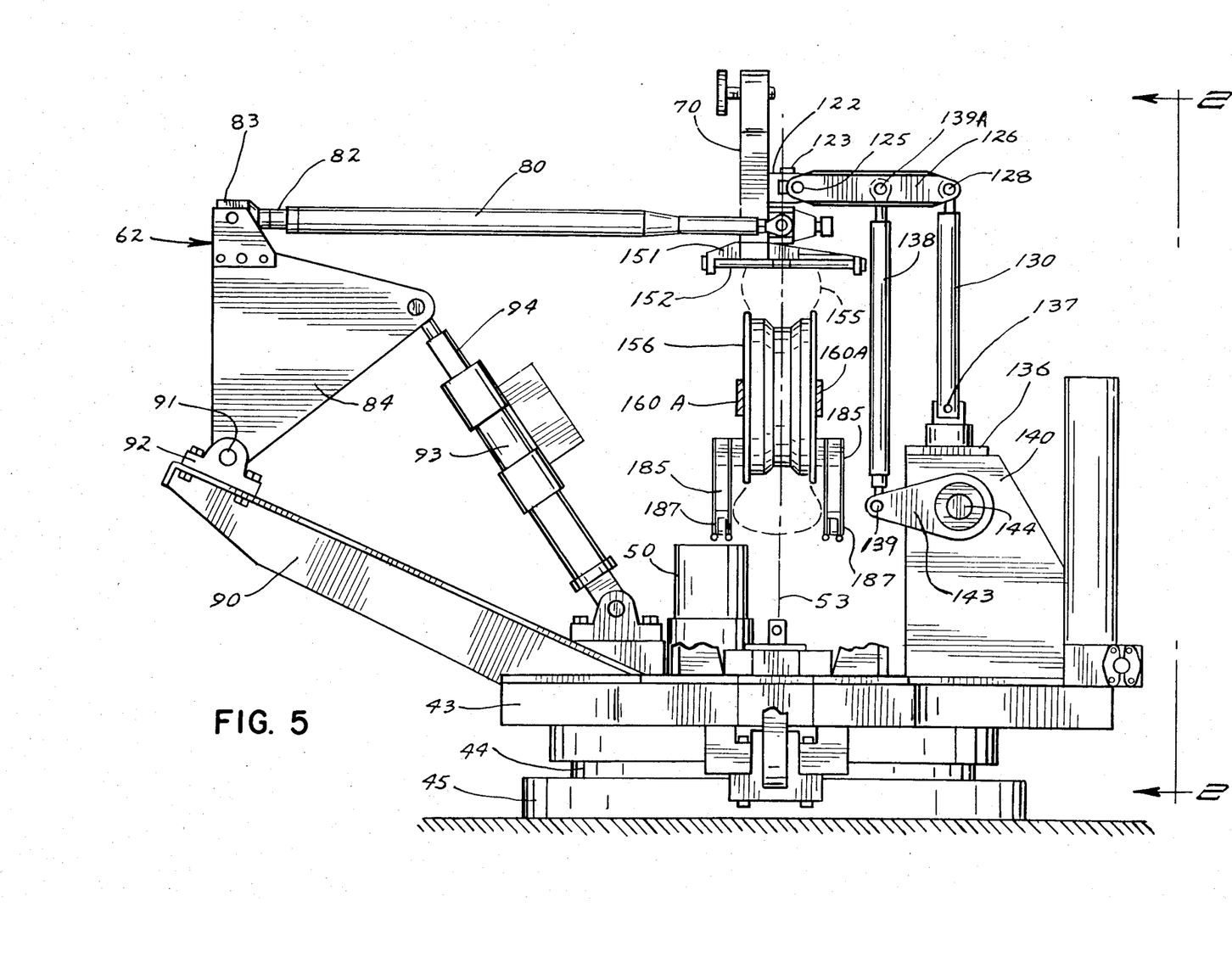
FIG. 5 is a side view taken on line 5—5 in FIG. 3.

A front wheel axle or spindle on an automobile may have brake torque loads tending to rotate the axle about the axle axis indicated at 120. These loads arise in use as braking loads. These loads are resisted by a brake torque reaction assembly 66. As shown in FIGS. 1, 2 and 5, the legs 71 and 72 of adapter plate 70 each have a bracket 122 attached thereto. These brackets 122 have vertically spaced ears 123 at their end portions which are spaced outwardly from the central axis than the legs 71 and 72, and the ears 123 of each bracket mount pins which are vertical axis pivot pins and which are just slightly inboard from the rod ends 81 of the struts 80. These pivot pins 123 (see FIG. 2) are used to mount a pivoting hub 124 that can rotate around a vertical axis. As shown in FIGS. 2 and 5, each hub 124 fits between upper and lower ears 123 on the respective bracket 122. Each hub 124 has a horizontal pin 125 that mounts a brake torque reaction arm 126 with respect to the respective legs 71 and 72. These brake torque reaction arms 166 have opposite ends that are pivotally mounted on pins 128 that in turn are connected to rod ends 129 on upright compression carrying legs 130. The legs 130 in turn are attached to a plate 136 through suitable pins 137. The plate 136 is fixed to a pedestal 140 which is mounted to turntable 43, and the pedestal 140 rotates with the turntable. A separate strut 138 is coupled to each arm 126, between pins 125 and 128, with pins 139A and the lower ends of the struts 138 are attached with pins 139 to separate pairs of arms 143 which are on opposite ends of a torque tube 144 that is rotatably mounted on pedestal 140 about a horizontal axis (parallel to pins 139). Thus, the ends of the levers 126 remote from the pins 125 are held from differential vertical movement relative to the turntable, and the tendency of one of the levers 126 to move relative to the other as the specimen adapter plate 70 tends to pivot about axis 120 will be reacted through the levers 126 and struts 138 to the torque tube 144.

The respective pair of arms 143 for the struts 138 have to twist with respect to the other pair of arms 143 through the torque tube 144 in order for the specimen adapter plate 70 to rotate about axis 120, under torque loading. The torque tube 144 can be made very rigid, so that the torque on the specimen adapter plate will be positively resisted. There will be no torque loading of the specimen being tested unless it is desired.

As will be explained, the torque tube 144 can be replaced with a two part tube so that the pairs of arms 143 can be intentionally rotated relative to each other to induce braking torque loads in the specimen.

The lower ends of the legs 71 and 72 of the specimen adapter plate 70 are made to mount and support independent sets of rollers, which roll about axis parallel to the axis 120. The rollers are mounted in housings 150 and 151, which are attached to the lower ends of legs 71 and 72, respectively, and the housings 150 and 151 typically have rollers indicated at 152 in FIG. 5, for example, extending parallel to the axis 120. The rollers 152 are of sufficient length so that they will permit the vertical loading assembly 60 to be loaded against the rollers 152 through a pneumatic tire indicated at 155 that is mounted on to a wheel 156. The wheel and tire will be loaded for applying vertical loads to the specimen through the specimen adapter plate 70.

The rollers 152 are mounted on rotational axes that form a plane. The rollers 153 provide a desired length of support in direction of the longitudinal load strut 98 (fore and aft), and as the pneumatic tire 155 is loaded against rollers 152 it will form a tire patch loading area, much like that which is formed when the tire is on a road surface.

The axle 157 for wheel 156 is mounted on a loading arm assembly 160 comprising a pair of spaced apart arm members 160A that are pivotally mounted on a shaft 161 at the end opposite the axle 157. The shaft 161 is adjustably mounted on support assemblies indicated generally at 162 (see FIGS. 4, 6 and 7). The support assemblies 162 each include a first pair of arms 163 that clamp and hold the shaft 161, and the opposite ends of the arms 163 are mounted onto a pin 164 that passes through a pair of support plates 165. The support plates 165 in turn have a pin 166 passing therethrough, which also passes through vertical slots 170 in the adjacent set of arms 163. The slot 170 permits adjusting the vertical height of the shaft 161 to accommodate different geometries of the specimen mounting, and also for permitting alignment of the parts. The plates 165 have horizontal slots at 171 therein as shown in FIG. 4, to permit the plates to be adjusted slightly as to the position of the pin 164 as well.

The plates 165 are mounted on a support plate 175. Thus there are two of these assemblies, including the support plates 175, one on each side of the arm assembly 160. Each of the support plates 175 is mounted onto a pedestal 176 that is fixed to the turntable 43, and extends uprightly with respect thereto.

The vertical loading is accomplished through a servo controlled double acting hydraulic actuator 180 that has its base end pivotally mounted on a pin 181 with respect to mounting brackets on the turntable 43. The actuator 180 has an extendable and retractable rod 182 that is mounted with a rod end to a pin 183 that passes through the arm members 160A forming the arm assembly 160. The rod 182 is positioned between the individual arm members 160A.

Extension and retraction of the rod 182 under hydraulic pressure will cause the tire 155 to be loaded against the rollers 152, and thus apply a vertical load to the specimen adapter plate 70, and thus to the specimen and housing 33. The actuator 180 has a displacement transducer (LVDT) that measures the displacement of the rod 182 to provide a position indicating the vertical position of the axle being tested, because of the substantial movement of the axle during testing. The strut assembly 35 permits substantial vertical excursions under load and the displacement signal from actuator 180 is used for deriving a signal for compensation of other load inputs, as desired.

The wheel 156 does not rotate during use, and as shown in FIGS. 4 and 5 in particular, suitable brackets 185 are connected to the wheel 156 with bolts, and brackets 185 have end members that extend downwardly on opposite sides of the tire. These brackets 185 in turn have pins 186 at their lower ends and reaction links 187 are connected to the pins 186 through suitable rod ends. The opposite ends of the links 187 from the pins 186 are mounted onto support brackets 190 through pins 191. The support brackets 190 are in turn attached to the pedestals or frame used for suppporting the vertical loading assembly.

The actuator 180 has a suitable servo valve indicated generally at 193 mounted directly to it, as can be seen in FIG. 4. These hydraulic connections and control valve are conventional.

The plates 175 also can be adjustably mounted onto the upright supports 176, so that there can be in and out adjustment of the loading tire 155 relative to the rollers 152.

Links 187 form a four bar linkage with the arm assembly 160, to keep the tire 155 properly oriented as the arms 160 are moved toward and away from the roller housings 150 and 151 to load the specimen adapter plate and the specimen.

The steer motor 25 has a feedback transducer for feedback control, and the overall controls will provide a program for applying the vertical, longitudinal, and lateral loads, and also steering motions. Signals from the steer motor will be used to drive the turntable drive motor 50 so that the turntable will turn and the steering loads can be controlled precisely by controlling the actuators 93 to provide for road simulation.

It should be noted that pressure accumulators can be utilized for smoothing out surges in pressure, but that the servo actuators will provide precise loads and displacements as directed by the servo valves that control the respective actuators.

Figure 6:
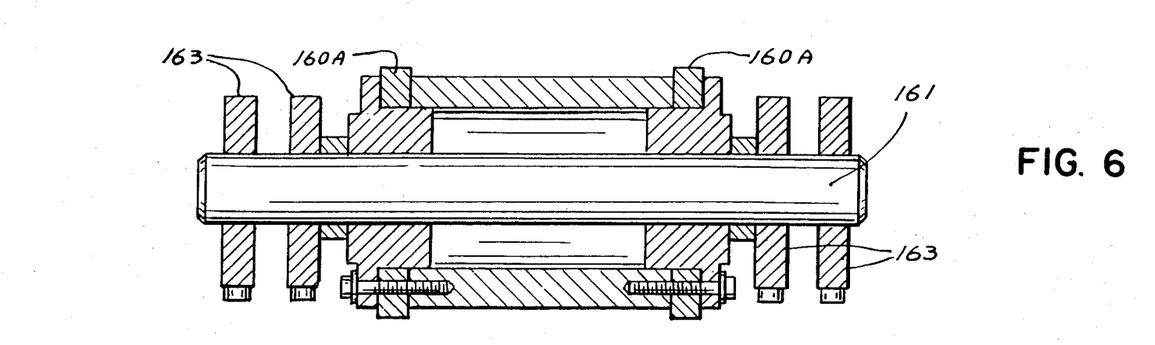
FIG. 6 is a sectional view taken on line 6—6 in FIG. 4.
Figure 7:
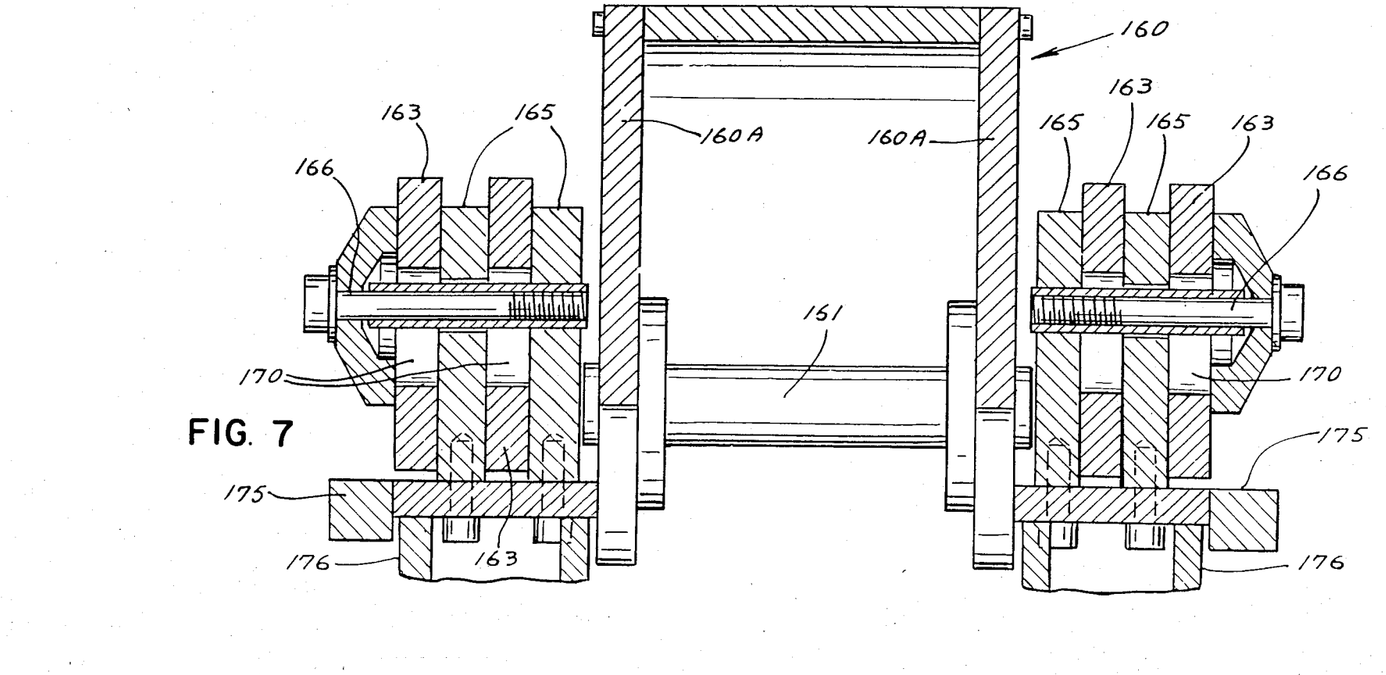
FIG. 7 is a sectional view taken on line 7—7 in FIG. 4.
Figure 8:
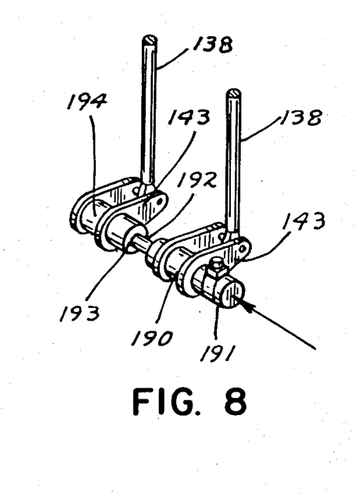
FIG. 8 is a perspective view of an optional brake torque loading device used with the test system of the present invention.

In FIG. 8, the optional brake torque assembly is illustrated. The brake torque assembly will replace the torque tube 144, and as shown in FIG. 6, a short tube 190 is rotatably mounted on a support pedestal, and mounting the arms 143, which control the lengths 138. One set of arms 143 on the tube 190 is mounted directly to the housing of a rotary actuator 191, and the output shaft of the rotary actuator passes through the tube 190, and is driveably connected as at 193 to a second tube section 194 which is also rotatably mounted in the pedestal on the turntable, and has a pair of arms 143 attached thereto.

Thus, by operating the actuator 191 (which is made to have adequate power to carry the necessary torques) a differential in movement between one set of arms 143 and the other set can be achieved, and this can provide differential loading through the links 138. The leg 71 of the specimen adapter plate 70, for example, can be loaded differently than the leg 72. This will cause a braking torque load about the axis 120, and this torque can be programmed to be controlled as desired.

The specimen adapter plate 70 and fitting connected thereto are selected to have substantially the same mass as the mass acting on the axle during road operation. This is the unsprung mass or the mass not supported on springs relative to the axle.

There is no cross coupling of this braking torque between the horizontal loading channels, that is between the lateral load and the longitudinal load, because it is competely independent in application.

The longitudinal loading is brought in at the tire patch location, without causing torsional loading because the fixture itself is normally held very rigidly by the torque tube 144 that resists differential movement of the levers 126 and thus differential movement of the legs 71 and 72 of the specimen adapter plate 70.

The specimen adapter plate 70 does not pivot about a steering axis, and is held at a reference position about a vertical axis when the turntable is rotated by loading arms 80. The arms 80 and lever 73 are mounted on rod ends with sufficient clearance so that the turntable can rotate in the range of 50° in each direction from the centered position to simulate a total steering motion of about 100°.

FIG. 2 includes a simplified schematic for illustrating the ability to obtain information, particularly relating to wheel hop, from the test system of the present invention in a simple, convenient manner, and also illustrates generally in block diagram the known servo controls for applying vertical, longitudinal and lateral loads.

A command source or function generator indicated generally at 200 is provided with a number of individual channels in a normal manner as shown in the prior art discussed for testing vehicles. One of the commands can be provided along the line 201 to suitable servo controls indicated at 202 that are generally represented for controlling all of the functions of the machine. A signal provided on line 203 will be provided directly to control the motor 25 to rotate it, as an output of a servo valve proportional to the control signal on line 201. A feedback transducer indicated at 204 provides a feedback signal along a line 205 back to the servo controls, and this feedback signal is used for delivering a control signal to motor 50 along a line 206. Hydraulic fluid under pressure is provided to operate the motor 50 directly.

The servo controls 202 include inputs represented generally at 210, 211 and 212 for controlling the commands for vertical, longitudinal and lateral load or displacement. The servo controller 202 will provide outputs on lines 210A, 211A and 212A to control the actuators. The actuators can be controlled either in displacement or load control. Additionally, the servo controls can provide an output to control the brake torque reaction actuators if desired. Suitable feedback signals are provided along lines 210B, 211B and 212B for the vertical, longitudinal and lateral feedbacks respectively.

The vertical feedback signal along line 210B is provided in a manner that will take into account the "wheel hop" and it can be done in a relatively simple manner illustrated schematically in FIG. 2. The spindle support 33 has a bracket or suitable fixture 215 mounted thereon that moves directly with the spindle, and an LVDT, or displacement transducer 216 is supported relative to the frame and directly senses the amount of movement of the spindle support 33. This provides an output signal indicating displacement along line 217, to a summing junction 218 which is also connected to receive a feedback displacement signal from a transducer 219 on actuator rod 182, that indicates the amount of movement, that is actual movement, of the wheel and tire that is loading the spindle. If there is a difference between the two, the difference is caused by wheel hop, and that output can be fed along line 220, that can be fed directly into the channel for controlling the longitudinal and lateral actuators, and cause the loads on the longitudinal and lateral actuators to drop off or change as would be occurring in ordinary road travel when the wheel leaves the surface of the road. The line 210B is shown coming from displacement actuator 219 to provide the normal feedback signal for control, but the signal on line 220 which is a function of the difference in the displacements between the spindle support 33, and the displacement indicated by the actuator 180 through rod 182, will provide the necessary control for dropping off the longitudinal and lateral loads to fully simulate actual wheel hop.

The controls are primarily conventional, except that the ability to measure actual displacement of the spindle support because it is fully spring mounted, and compare it with the displacement of the vertical actuator of applying vertical loads provides a way of determining wheel hop and using this as a compensating signal for longitudinal and lateral loading is disclosed.

What is claimed is:

1. A road simulator test stand comprising:

a support frame, said support frame mounting a specimen mounted for substantial vertical movement through a spring mounting;

a specimen adapter coupled to load said specimen, said specimen adapter having means for receiving vertical loading in direction simulating vertical loading of the specimen;

means for applying a vertical load to said specimen adapter across a substantial distance;

means for applying a lateral load to said specimen adapter in direction substantially perpendicular to the vertical load;

means for applying a longitudinal load at substantially right angles to the lateral load;

said means for applying said lateral load and said longitudinal load having loading axles generally in a plane at a desired level on the specimen; and a turntable mounted for movement about a vertical axis with respect to said support frame and said turntable mounting said means for applying vertical load, longitudinal load, and lateral load respectively.

2. The apparatus of claim 1 and means for applying steering signals for moving said turntable about the vertical axis to simulate steering loads on the specimen adapter.

3. The apparatus as specified in claim 1 wherein said means for applying a vertical load comprises a pneumatic tire loaded against said specimen adapter.

4. The apparatus as specified in claim 3 wherein said pneumatic tire is restrained from rotation about a rolling axis during loading.

5. The apparatus as specified in claim 4 wherein said specimen comprises a front wheel mounting assembly for a vehicle having a wheel rotatably mounted thereon during use, the means for applying vertical load comprising an arm member mounting a wheel which mounts the pneumatic tire, a plurality of rollers having generally parallel axes and said parallel axes being generally parallel to the rolling axis of the pneumatic tire, means to support said rollers at a level simulating a tire patch radius for a wheel used with the specimen being tested when in actual use, said pneumatic tire engaging said rollers and being loaded in a direction generally perpendicular to the plane defined by loading of said lateral and longitudinal loading means.

6. The apparatus as specified in claim 5, and means to resist rotation of said specimen adapter about the axis of an axle being tested.

7. The apparatus as specified in claim 6 wherein said means to resist rotation comprises a torque tube mounted on said turntable, a pair of spaced links coupled to the specimen adapter on force lines spaced from and on opposite sides of the axis of an axle to be tested, said spaced links also being connected to opposite ends of said torque tube to resist movement of the specimen adapter about the axis of an axle to be tested.

8. The apparatus of claim 5 including means to pivotally mount the arm member with respect to the turntable, including a pivot shaft, and mounting supports for said pivot shaft adjustably mounted on said turntable permitting adjustment of said pivot shaft in mutually perpendicular planes.

9. The apparatus as specified in claim 1 wherein said means for applying a longitudinal load comprises a strut capable of being loaded in tension and compression, and a lever having a lever axis at substantially right angles to said strut, said lever being pivotally coupled to said specimen adapter and having an opposite end pivotally mounted with respect to the turntable, said lever being attached to said specimen adapter through a coupling that permits pivoting movement about mutually perpendicular axes defining a plane perpendicular to the axis of an axle being tested.

10. A road simulator test stand comprising:
a support frame, said support frame mounting a specimen having an axle to be tested, which axle is mounted for vertical movement through a spring mounting;
a specimen adapter coupled to load said axle, said specimen adapter having means for receiving vertical loading in direction simulating vertical loading of a wheel mounted on said axle;
means for applying a vertical load to said specimen adapter;
means for applying a lateral load to said specimen adapter in direction substantially parallel to the axis of the axle;
means for applying a longitudinal load to the specimen adapter at substantially right angles to the direction of application of said lateral load;
said means for applying said lateral load and said longitudinal load having loading axes generally in a plane at a level which corresponds to the tire patch radius of a wheel mounted on such axle to be tested;
a turntable mounted for movement about a steering axis with respect to said support frame, said turntable mounting said means for applying vertical load, said means for applying longitudinal load, and the means for applying lateral load respectively; and
means for applying steering signals for moving said turntable about the steering axis to simulate steering loads on the specimen adapter.

11. The apparatus as specified in claim 10 wherein said means for applying vertical load comprises a pneumatic tire load against said specimen adapter.

12. The apparatus as specified in claim 11 wherein said pneumatic tire is restrained from rotation during loading.

13. The apparatus as specified in claim 12 wherein said means for applying vertical load comprises an arm member mounting a wheel which mounts the pneumatic tire, said specimen adapter including means supporting a roller housing, a plurality of rollers having generally parallel axes which are generally parallel to the axis of an axle to be tested, rotatably mounted on said roller housing, said roller housing being supported at a level simulating a tire patch radius for a wheel used with a specimen when in actual use, said pneumatic tire engaging said rollers to load the rollers in a direction generally perpendicular to the plane defined by said lateral and longitudinal loading means. means.

14. The apparatus as specified in claim 12, wherein said means for applying a vertical load comprises an arm member pivotally mounted at a position spaced from the specimen to be tested, and an actuator coupled to said arm member to load said arm member in a direction to move the pneumatic tire toward the specimen being tested.

15. The apparatus as specified in claim 10 wherein said specimen adapter comprises a member having substantially the same mass as the mass supported by the axle to be tested during actual operation.

16. A road simulator test stand comprising:
a support frame, said support frame mounting a specimen having an axle to be tested, which axle has an axis and is mounted for movement in a first direction perpendicular to the axis through a spring mounting;
first means for applying a first load to said specimen substantially in the first direction substantially prependicular to the axis of the axle;
second means for applying a second load to the specimen at substantially right angles to the first direction and at substantially right angles to the axis of the axle;
a turntable mounted for movement about a steering axis with respect to said support frame, said turntable mounting said means for applying said first and second loads;
third means for applying steering signals for moving said specimen about a steering axis to provide steering motion; and
fourth means for rotating the turntable about its steering axis to carry the first and second means in an arc related to the steering motion to simulate steering loads on the specimen.

17. The apparatus as specified in claim 16, wherein said axle is used for mounting a wheel and tire assembly for rotation about the axis of the axle in use, and a specimen adapter rotatably mounted on said axle about the axis of the axle, said specimen adapter having a plurality of rollers thereon positioned substantially at the level of a tire patch for a wheel and tire assembly mounted on the axle in use, and wherein said means for applying said first load comprises a pneumatic tire bearing against said specimen adapter.

18. The apparatus as specified in claim 17, wherein the means for applying the first load further comprises an arm member pivotally mounted at a position spaced from the specimen, and mounted on the turn table, and an actuator coupled to said arm member and to said turn table to load said arm member in a direction to move the pneumatic tire toward the specimen adapter.

* * * * *